United States Patent
Wulf et al.

[11] Patent Number: 5,238,451
[45] Date of Patent: Aug. 24, 1993

[54] LIGHT ELIMINATOR FOR POULTRY HOUSE

[75] Inventors: Fred A. Wulf, Center; Robert Barnwell, Pittsburg, both of Tex.

[73] Assignee: Fred A. Wulf, Center, Tex.

[21] Appl. No.: 836,737

[22] Filed: Feb. 19, 1992

[51] Int. Cl.$^5$ ............................................. F24F 13/18
[52] U.S. Cl. .................................... 454/282; 454/905
[58] Field of Search ............... 454/275, 277, 281, 283, 454/905

[56] References Cited

U.S. PATENT DOCUMENTS

| | | | |
|---|---|---|---|
| 2,378,518 | 6/1945 | Trost | 454/905 X |
| 2,406,168 | 8/1946 | Shumaker . | |
| 3,217,631 | 11/1965 | Thompson et al. . | |
| 3,285,156 | 11/1966 | Bohanon | 454/277 |
| 3,628,442 | 12/1971 | Nijhuis | 454/277 |
| 4,989,502 | 2/1991 | Ospelt | 454/277 |

Primary Examiner—Harold Joyce
Attorney, Agent, or Firm—Jacobson, Price, Holman & Stern

[57] ABSTRACT

A light eliminator which permits passage of ventilating air but totally eliminates entry of light into the poultry house which includes a plurality of laterally spaced vertical fins or panels each of which is of a unique configuration which breaks the light four times in order to totally block the entry of light into a poultry house while maintaining a minimum air flow resistance with the fins being spaced apart by standoffs that are uniquely positioned with the fins generally being of W-shaped configuration whereby negative pressure within the poultry house provided by air circulating fans will not cause vibration or waffling of the fins when subjected to air velocities induced by high CFM capacity poultry house fans. The light eliminator is constructed of noncorrosive plastic material and can be assembled easily in a short period of time and is extremely durable resulting in low cost operation. The fins are straight on the inlet and exit side of the device to permit a straight air flow into the poultry house for elimination of dead air spots since air flow into the poultry house will not curve or angle to the sides.

6 Claims, 1 Drawing Sheet

U.S. Patent  Aug. 24, 1993  5,238,451
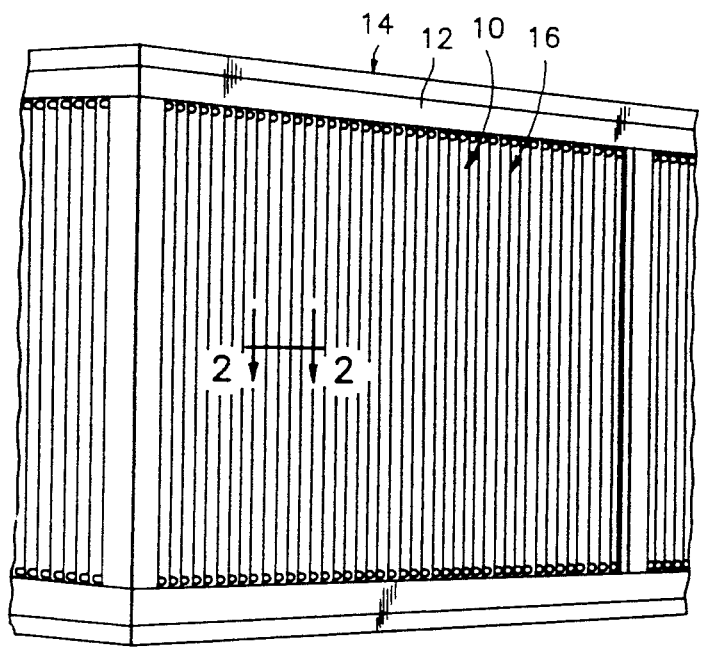
FIG. 1
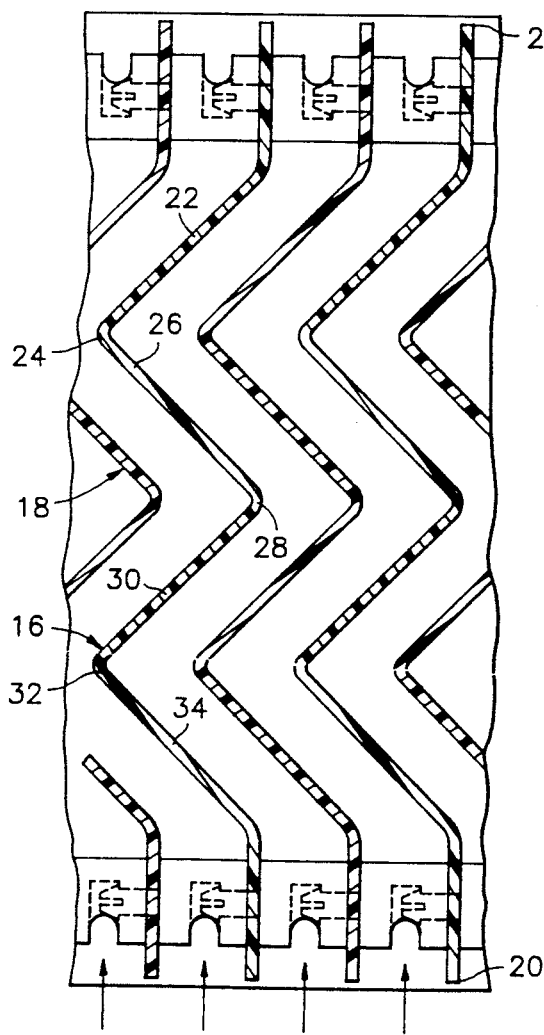
FIG. 2
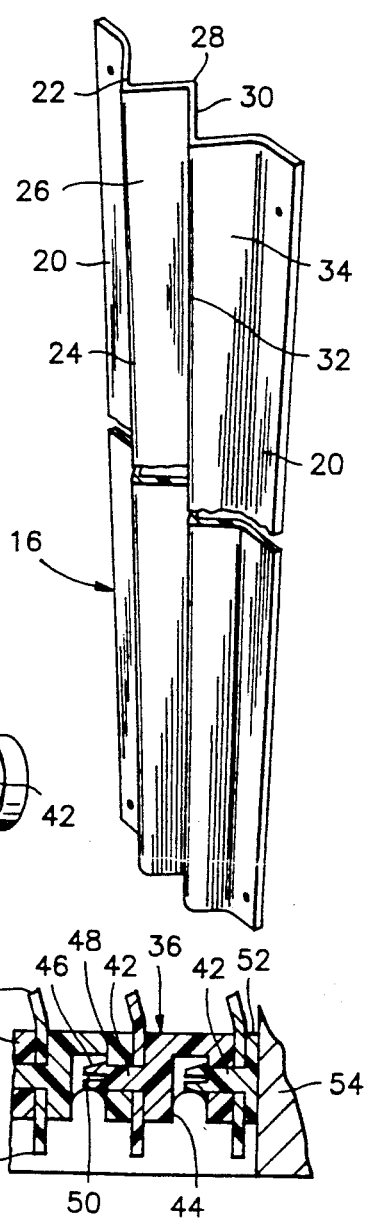
FIG. 5
FIG. 4
FIG. 3

LIGHT ELIMINATOR FOR POULTRY HOUSE

BACKGROUND OF THE INVENTION

1. Field of the Invention

The present invention generally relates to the ventilation of poultry houses and more specifically to a light eliminator which permits passage of ventilating air but totally eliminates entry of light into the poultry house. The light eliminator includes a plurality of laterally spaced vertical fins or panels each of which is of a unique configuration which breaks the light four times in order to totally block the entry of light into a poultry house while maintaining a minimum air flow resistance with the fins being spaced apart by standoffs that are uniquely positioned with the fins generally being of W-shaped configuration whereby negative pressure within the poultry house provided by air circulating fans will not cause vibration or waffling of the fins when subjected to air velocities induced by high CFM capacity poultry house fans. The light eliminator is constructed of noncorrosive plastic material and can be assembled easily in a short period of time and is extremely durable resulting in low cost operation. The fins are straight on the inlet and exit side of the device to permit a straight air flow into the poultry house for elimination of dead air spots since air flow into the poultry house will not curve or angle to the sides.

2. Description of the Prior Art

It has been recognized that it is advantageous to maintain the interior of poultry houses as dark as possible in order to increase production of the poultry housed within the poultry house. Also, ventilation systems are required which usually involve an exhaust fan or fans to maintain a negative pressure within the poultry house with an air inlet and air outlet being provided. However, the provision of air passageways through the walls of the poultry house also enable entry of light. Various types of light traps, shutters and the like have been utilized in an effort to reduce the entry of light into the poultry house. The following U.S. Pat. Nos. relate to light traps which permit passage of air and restrict or reduce the passage of light.

2,378,518
2,406,168
3,217,631
3,285,156
3,628,442

The prior art does not disclose a light eliminator equivalent to the specific structure of the above invention including the specific configuration of the vertically disposed fins or panels which provide for breaking the light four times thereby completely eliminating passage of light through the light eliminator while maintaining minimal resistance to air flow through the light eliminator with the specific structure of the fins or panels, the stand offs for supporting the fins in spaced relation and the specific dimensional characteristics all cooperating to produce a light eliminator which will totally prevent passage of light therethrough with minimal air flow resistance, and is totally non-corrosive, extremely durable, easily assembled in a very few minutes resulting in low cost operation.

SUMMARY OF THE INVENTION

An object of the present invention is to provide a light eliminator for poultry houses to completely exclude entry of light into the interior of a poultry house through a structure which permits passage of air through the wall of a poultry house but prevents entry of light by breaking the light four times.

Another object of the invention is to provide a light eliminator in accordance with the preceding object which includes a plurality of equally spaced, vertically disposed fins or panels having a generally W-shaped cross-sectional configuration with both side edges of each fin including a laterally extending, straight flange with the flanges lying in the same plane to enable passage of ventilating air with minimal air flow resistance with the vertical orientation preventing the collection of dust on the fins.

A further object of the invention is to provide a light eliminator as set forth in the previous objects in which the fins are spaced apart by stand off modules which can be assembled by snapping them together in clamping or retaining relation to the flanges on the opposite side edges of the fins to enable assembly of the light eliminator to fit a particular wall opening in a very short time.

Still another object of the invention is to provide a light eliminator in accordance with the preceding objects in which all of the components are constructed of a substantially rigid, plastic, non-corrosive material which is extremely durable and results in a low cost installation and operation.

A still further object of the invention is to provide a light eliminator as set forth in the preceding objects to completely occlude light from entering a poultry house to maintain the interior of the poultry house in a substantially totally blackout condition to enhance the production of eggs for hatchery purposes to increase the production of broilers from the hatchery eggs.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a portion of a poultry house illustrating the installation of the light eliminator.

FIG. 2 is a transverse, horizontal sectional view, on an enlarged scale, taken substantially upon a plane passing along section line 2—2 on FIG. 1 illustrating the structural details of the light eliminator.

FIG. 3 is a fragmental sectional view illustrating the stand off connecting modules for supporting the fins in spaced relation.

FIG. 4 is a perspective view of one of the stand off connector modules.

FIG. 5 is a perspective view of one of the fins or panels used in the light eliminator of the present invention.

DESCRIPTION OF THE PREFERRED EMBODIMENT

Referring now specifically to the drawings, the light eliminator of the present invention is generally designated by reference numeral 10 and is installed vertically in the wall 12 of a poultry house generally designated by reference numeral 14 with the size and dimension characteristics of the light eliminator varying depending upon the size of ventilating openings in the wall structure 12 of the poultry house 14.

As illustrated in FIG. 2, the light eliminator 10 includes a plurality of mutually spaced, vertically disposed fins or panels 16 which are vertically elongated longitudinally to fit within the vertical extent of an opening in the wall 12 and having a substantial lateral or transverse dimension. Each fin or panel 16 is constructed of a relatively thin but rigid plastic panel 18 and includes a cross-sectional configuration that is substantially W-shaped with the two side edges of the fin 16 including straight, vertical, laterally flat flanges 20 which are in alignment with each other and extend laterally outwardly from the two side edges of the fin 16. The portion of the panel 18 between the flanges 20 includes a slanted segment 22 extending from the flange 20 at the outlet side of the light eliminator with the inclined segment 22 terminating in an apex 24 spaced laterally from the flanges 20 with the panel then extending as an inclined segment 26 which terminates in an apex 28 which is in alignment with the flanges 20. Extending from the apex 28 is an inclined segment 30 terminating in an apex 32 in alignment with apex 24 with the panel 18 then extending in an inclined segment 34 which joins with the flange 20 at the inlet side of the light eliminator as indicated by the air flow arrows in FIG. 2. As illustrated, the flanges 20 and the apex 28 are substantially in the same vertical plane. The two apices 24 and 32 are also in substantially the same vertical plane but are located laterally of and beyond the vertical plane of the flanges 20 on the next adjacent fin 16. Thus, light entering the light eliminator from the inlet side thereof is broken four times by the inclined portions 34, 30, 26, 22 and the apices 32, 28 and 30.

The fins 16 are equally and mutually spaced by a plurality of snap together connector modules generally designated by reference numeral 36 with each module including a generally cylindrical body 38 of plastic material having a peg 40 extending axially from one end thereof and an aperture 42 in the other end thereof with the central portion of the body 38 including a lateral slot 44 extending inwardly from one edge thereof beyond the aperture 42 which provides a space for receiving the upper end of a peg 40 from an adjacent module. The outer end of the peg 40 is tapered at 46 with the inner larger end of the tapered portion 40 defining a shoulder 48 to engage the surface of the inner wall of the slot 44. The outer end of the peg 40 is provided with a longitudinal slot 50 to enable the outer end of the projection to be collapsed inwardly to enable insertion of a peg 40 into an aperture 42 and to enable the tapered tip end 46 of the peg to be squeezed inwardly to release the peg from the aperture 42. This structure enables assembly and disassembly of the fins 16 to enable the size of the light eliminator to be adapted to the size of the opening in the poultry house wall. The endmost connector module includes a circular flange or plate 52 having a peg or projection 54 thereon which is the same as the peg or projection 40 for engagement with the next adjacent connector module 36 as illustrated in FIG. 3.

The light eliminator of this invention breaks the light four times by engagement with the surface of inclined portions 34, 30, 26 and 22 on adjacent fins 16. In addition to breaking the light four times which eliminates light reflection from dust build-up on the surfaces, the light eliminator enables air to flow from an entrance defined by the spaced flanges 20 to an exit defined by the opposite flanges 20 with the air flow being substantially laminar as it exits the light eliminator thus preventing air movement from curving when it exits from the light eliminator thereby eliminating dead air spots.

The fins 16 are spaced apart approximately 1⅜" and the angled portions have an included angle of about 82°. The light eliminator provides a pressure drop of 0.049 at 1,000 FPM and 0.014 at 750 FPM air velocity thereby providing a high volume air flow with less air restriction. The straight flanges on the inlet and exit side of the eliminator allows for a more even, straight air flow coming into the poultry house and eliminates dead air spots. Because of the "W" design of the fins, negative pressure does not cause vibration of the fins thereby eliminating any distortion of air flow patterns. The capacity of exhaust fans in a poultry house is greater than the capacity of the air inlet to maintain a negative pressure which will insure uniform velocity to prevent the fan end of the poultry house from being warmer with maximum negative pressure at the inlet end not exceeding 0.05. To accomplish this, the light eliminator should have 1 sq. in. of trap area for each 6 CFM's of the fans. The light eliminator is constructed so that special tools are not required for assembly and can be made in various standard sizes and custom sizes with all light eliminators breaking the light four times thus providing total blackout for the poultry house while maintaining maximum air flow with less restriction and no vibration or waffling.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A light eliminator for poultry houses adapted to be mounted in a wall opening to enable flow of air through the opening and preventing entry of light through the opening, said light eliminator comprising a plurality of longitudinally elongated, parallel fins with each fin being of one-piece construction of rigid, non-corrosive material, means supporting said fins in equal laterally spaced vertically disposed relation throughout their length, each of said fins having a substantially W-shaped crosssectonal configuration, the opposite side edges of each fin including a straight flange extending outwardly therefrom with the straight flanges being disposed in the same plane, each fin having inclined portions joined by angular apices, at least one apex being in the same plane as the straight flanges, said means spacing the fins including a plurality of connector modules interconnecting the flanges at the side edges of the fins, each of said modules including a generally cylindrical body and snap together male pegs and female apertures on said modules for assembling the modules and fins without tools by inserting a peg on one module through an opening in the flange of a fin and into snap engagement with an opening in an adjacent module.

2. The light eliminator as defined in claim 1 wherein the inclined portions of the W-shaped fin have included angles of approximately 82° at the apices.

3. The light eliminator as defined in claim 2 wherein each of said fins is constructed of a relatively thin, rigid plastic material.

4. The light eliminator as defined in claim 1 wherein each of said pegs is provided with a slotted outer end having a inward external taper increasing in diameter to a diameter greater than the peg to define an inwardly facing shoulder to snap engage with an adjacent module with the slotted end of the peg enabling the collapse of the slotted end thereof to enable assembly and disassembly of the modules and fins.

5. The light eliminator as defined in claim 1 wherein said fins are spaced apart a distance to permit flow of a high volume of air with minimal restriction with air passing between the fins exiting from the fins in a laminar flow condition to eliminate dead air spots in a poultry house.

6. The light eliminator as defined in claim 1 wherein said W-shaped configuration breaks the light four times between the opposite side edges thereof, said vertical disposition of said fins preventing gravitational collection of light-reflecting dust on vertical surfaces of the fins.

* * * * *